United States Patent [19]

Blackwell et al.

[11] Patent Number: 4,501,794
[45] Date of Patent: Feb. 26, 1985

[54] PHENOLIC FOAM COMPOSITES AND PROCESS FOR MAKING THEM

[75] Inventors: James B. Blackwell, Macclesfield, England; Gerald C. Marks, Cardiff, Wales; Paul Vereecke, Kortrijk, Belgium

[73] Assignee: BP Chemicals Limited, London, England

[21] Appl. No.: 517,719

[22] Filed: Jul. 27, 1983

[30] Foreign Application Priority Data

Jul. 30, 1982 [GB] United Kingdom ............... 8222035
Aug. 7, 1982 [GB] United Kingdom ............... 8222846

[51] Int. Cl.³ ............................................. B32B 3/26
[52] U.S. Cl. .................................. 428/316.6; 156/79; 264/46.2; 428/319.1
[58] Field of Search ............... 428/316.6, 309.9, 314.4, 428/314.8, 316.6, 317.5, 317.7, 319.3, 319.7; 156/79; 264/46.2

[56] References Cited

U.S. PATENT DOCUMENTS

| | | | |
|---|---|---|---|
| 2,993,871 | 7/1961 | Shannon et al. | 428/304.4 |
| 3,320,087 | 5/1967 | Erickson | 428/304.4 |
| 3,968,300 | 7/1976 | Moss et al. | 428/314.4 |
| 4,165,413 | 8/1979 | Sefton et al. | 521/128 |
| 4,233,361 | 11/1980 | Fultz | 428/319.1 |
| 4,364,892 | 12/1982 | Rehlen et al. | 428/316.6 |

Primary Examiner—William J. Van Balen
Attorney, Agent, or Firm—Brooks, Haidt, Haffner & Delahunty

[57] ABSTRACT

A continuous process for the production of a phenolic foam composite comprises bringing a preformed layer of flexible insulating material whose thermal conductivity is less than 0.10 W/m° C. for example polystyrene foam into contact with a phenolic foam forming mixture and allowing the phenolic foam forming mixture to foam and set so as to form a layer of phenolic foam bonded to the layer of flexible insulating material.

A second preformed layer of flexible insulating material whose thermal conductivity is also less than 0.10 W/m° C. can be brought into contact with the phenolic foam forming mixture so as to form a sandwich structure with the layers of flexible insulating material bonded to opposite faces of the layer of phenolic foam. The effect of the layers of flexible insulating material is to decrease the variation in properties of the foam through its cross section.

9 Claims, 1 Drawing Figure

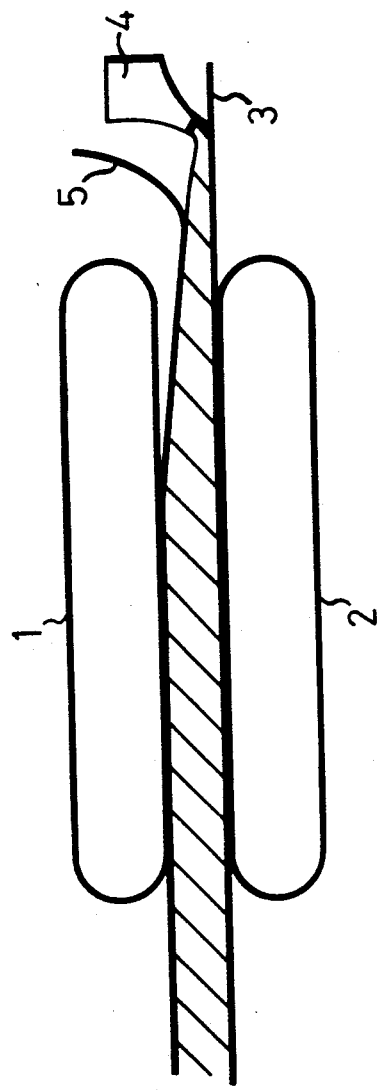

PHENOLIC FOAM COMPOSITES AND PROCESS FOR MAKING THEM

The present invention relates to phenolic foam composites and a process for their production.

Composite products having a phenolic foam core and layers of another material on opposite faces of the phenolic foam core are disclosed in, for example, GB No. 2 032 843. In the process described in this specification the phenolic foam is prepared by a batch process and glass fibre non-woven tissues are applied to opposed sides of the foam block. Such a batch process is an expensive way of making phenolic foam composite materials.

GB No. 1 283 113 discloses that phenolic foam can be made by a continuous process. However, it has been found that it is difficult to make the phenolic foam by a continuous process because a non-homogeneous product of non-uniform density is often produced. Furthermore, if it is desired to make a composite phenolic foam product by applying a flexible sheet of material to the phenolic foam, it is found that creasing of the flexible sheet material applied to the phenolic foam often occurs when the composite product is allowed to stand. It is desirable to make phenolic foam products which are covered with a sheet material e.g. aluminium foil on one or more faces in order to improve their heat resistance and handling properties. In this connection GB Pat. No. 2055845A describes a process in which a phenolic foam forming mixture is cured between two sheets of Kraft paper, corrugated paper or board, impregnated felts, glass mats, foil craft laminates or plastic films to form foamed board for insulation.

It has now been found that by using one or more layers of flexible insulating material of lower thermal conductivity than those described in the above mentioned patent that the rate of production of the foam can be increased and that the variation of properties through the foams cross-section is decreased.

According to the present invention a phenolic foam composite comprises a layer of phenolic foam having bonded thereto a layer of a flexible insulating material whose thermal conductivity is less than 0.10 W/m°C.

The flexible insulating material which is conveniently in the form of a sheet should be sufficiently flexible and of such a thickness as to follow the expansion and/or contraction of the foam. If the flexible insulating material is not able to conform with expansion or contraction of the phenolic foam during the foaming, curing and subsequent cooling then deformation of the layer of flexible insulating material may occur, thereby detracting from the appearance of the finished product.

Preferably the thermal conductivity of the flexible insulating material is less than 0.06 W/m°C. more preferably less than 0.05 W/m°C., as this enables thinner layers of material to be used.

It is preferred to use a layer of flexible insulating material having a thickness in the range 5 to 0.5 mm more preferably from 1.0 to 4.0 mm.

The layer of insulating material should also be compressible, that is, it should be possible to compress it across its width and length to a significant extent so that a reduction takes place in the dimension (width or length) across which the compressive force is applied. Thus paper will not be a suitable material because a compressive force applied across the sides of a sheet of paper will tend to cause the sheet to bend rather than any reduction in the width of the sheet of the paper itself.

The insulating material preferably is compressible by at least 2% of the dimension across which the compressive force is applied, when subjected to a compressive force corresponding to that resulting form a change of dimension of the phenolic foam in the period after setting.

The sheet of flexible insulating material is preferably porous, i.e. it allows gases and vapours, in particular water vapour, to pass through it. The degree of porosity may vary over a wide range.

Particularly preferred materials for use as the flexible insulating sheet of the present invention are polymer foams containing at least a proportion of open cells, so to allow gases and vapour to pass through.

Particular examples of polymer foams which can be used in the process of the present invention are polystyrene foam alternatively known as expanded polystyrene, polyurethane foam, phenolic foam and isocyanurate foam.

Preferably the layer of phenolic foam is disposed between and bonded to two layers of flexible insulating material, the thermal conductivity of both the latter layers being less than 0.10 W/m°C.

According to another aspect of the present invention a continuous process for the production of a phenolic foam composite comprises bringing a preformed layer of flexible insulating material whose thermal conductivity is less than 0.10 W/m°C. into contact with a phenolic foam forming mixture and allowing the phenolic foam forming mixture to foam and set so as to form a layer of phenolic foam bonded to the layer of flexible insulating material.

The process can comprise bringing a second preformed layer of flexible insulating material whose thermal conductivity is less than 0.10 W/m°C. into contact with the phenolic foam forming mixture so as to form a double sandwich structure with the layers of flexible insulating material bonded to opposite faces of the layer of phenolic foam.

It is preferred to form a double sandwich structure since this reduces the occurrence of warping of the panels caused by uneven cure throughout the thickness of the foam.

Conveniently the two preformed layers between which the phenolic foam is interposed are of the same material and thickness, but it is within the scope of the present invention for them to be of different materials for example one a polystyrene foam the other a polyurethane foam and of different thicknesses.

The phenolic foam can be prepared by any of the techniques known in the art, for example as described in any of the following patents: GB No. 2031786A; GB No. 2032843A; GB No. 1283113 and GB No. 2055845A. The process of the present invention is particularly useful however for the production of foams of relatively low reactivity. It is believed that foams produced from mixtures of relatively low reactivity have superior properties.

BRIEF DESCRIPTION OF THE DRAWING

The sole FIGURE is a diagrammatic view of apparatus used in making the composite sheets of this invention.

The invention will now be illustrated by reference to the following drawing which represents schematically an apparatus for continuously forming a phenolic foam composite. The apparatus will not be described in detail as apparatus for making continuous foam is well-known in the polyurethane art.

The apparatus consisted of two continuous conveyor belts 1 and 2 driven by suitable machinery (not shown) which defined the upper and lower surfaces of the foam sheet formed by feeding foamable material between them. A flexible sheet of foamed polystyrene 3 was fed on to the lower conveyor belt 2. The thickness of the polystyrene foam was 2 mm, its thermal conductivity was 0.04 W/m°C.

A foamable phenolic resole mixture was fed on to the sheet 3 from a dispensing apparatus 4. The foam mixture had a cure time of 6 minutes.

A second sheet 5 of flexible polystyrene foam identical with the first was applied to the upper surface of the foaming mixture and a sandwich of the two polystyrene layers with the foaming phenolic resin passed between the conveyors 1 and 2, so that foaming and curing took place with the polystyrene in contact with the phenolic foam, thus bonding the polystyrene to the phenolic foam.

The composite sheet was removed from the conveyors and cut into individual sections. No external heating was used after emergence from the conveyor and after being stored for 24 hours in an environment at ambient temperature (i.e. 20° C.) the surfaces of the composite sheets showed no wrinkling or creasing. There was no significant variation in density across the thickness of the phenolic foam core of the sheet.

An aluminium foil was applied to one surface of the composite sheet after four hours had elapsed by applying with a heated roller. The aluminium foil showed no creasing or wrinkling when stored for 24 hours. This is a further advantage over the prior art in that when aluminium foil has been applied directly to the layer of phenolic foam without the layer of flexible insulating material, wrinkling of the foil has been found to occur during storage.

We claim:

1. A phenolic foam composite comprising a sheet of phenolic foam disposed between and bonded to two sheets of flexible insulating material, the thermal conductivity of both of the latter sheets being less than 0.10 W/m°C.

2. A phenolic foam composite which comprises a sheet of phenolic foam disposed between and bonded to two sheets of flexible insulating material comprising polystyrene foam, both of said sheets of polystyrene foam being a thermal conductivity of less than 0.10 W/m°C.

3. A phenolic foam composite essentially consisting of a sheet of phenolic foam having bonded thereto a sheet of a flexible insulating material whose thermal conductivity is less than 0.10 W/m°C.

4. A phenolic foam composite as claimed in claim 3 or claim 1 wherein the thermal conductivity of the sheet of flexible insulating material is less than 0.06 W/m°C.

5. A phenolic foam composite as claimed in either claim 3, or claim 1 wherein a sheet of reflective metal foil is bonded to at least one face of the composite.

6. A continuous process for the production of a phenolic foam composite which process comprises continuously bringing a preformed sheet of flexible insulating material whose thermal conductivity is less than 0.10 W/m°C. into contact with a phenolic foam forming mixture and transporting the insulating material and phenolic foam forming mixture together and allowing the phenolic foam forming mixture to foam and set so as to form a sheet of phenolic foam bonded to the sheet of flexible insulating material and to decrease the variation in properties of the foam through its cross section.

7. A continuous process as claimed in claim 6 which comprises bringing a second preformed sheet of flexible insulating material whose thermal conductivity is less than 0.10 W/m°C. into contact with the phenolic foam forming mixture so as to form a sandwich structure with the sheets of flexible insulating material bonded to opposite faces of the sheet of phenolic foam.

8. A continuous process as claimed in claim 7 wherein each of the sheets of flexible insulating material has a thickness in the range 0.5 to 5.0 mm.

9. A continuous process as claimed in claim 7 wherein the phenolic foam forming mixture is deposited on one of the preformed sheets of flexible insulating material on a moving belt and the second preformed sheet of flexible insulating material is laid on top of the phenolic foam forming mixture.

* * * * *

UNITED STATES PATENT AND TRADEMARK OFFICE
CERTIFICATE OF CORRECTION

PATENT NO. : 4,501,794
DATED : February 26, 1985
INVENTOR(S) : JAMES BRIAN BLACKWELL et al It is certified that error appears in the above-identified patent and that said Letters Patent is hereby corrected as shown below:

Col. 2, line 6, "form" should read --from--

Signed and Sealed this

Twentieth Day of August 1985

[SEAL]

Attest:

DONALD J. QUIGG

Attesting Officer Acting Commissioner of Patents and Trademarks